United States Patent [19]

Mabery et al.

[11] 4,270,690

[45] Jun. 2, 1981

[54] METHOD OF FORMING VARIABLY RIFLED TUBES

[75] Inventors: Thomas L. Mabery, East Ridge; Francis B. Jackson, Chattanooga, both of Tenn.

[73] Assignee: Combustion Engineering, Inc., Windsor, Conn.

[21] Appl. No.: 73,968

[22] Filed: Sep. 10, 1979

[51] Int. Cl.³ .............................................. B23P 15/26
[52] U.S. Cl. ........................... 228/173 F; 29/157.3 R; 72/283; 72/370
[58] Field of Search ...................... 228/173 F, 173 A; 72/283, 370; 29/157.3 R, 456; 165/179

[56] References Cited

U.S. PATENT DOCUMENTS

| | | | |
|---|---|---|---|
| 2,708,306 | 5/1955 | Lampton | 29/456 X |
| 3,289,451 | 12/1966 | Koch et al. | 72/283 |
| 3,422,518 | 1/1969 | French | 72/283 X |
| 3,543,805 | 12/1970 | Matthews et al. | 138/141 |
| 3,768,291 | 10/1973 | Rieger | 165/179 X |
| 3,830,087 | 8/1974 | Nakamura et al. | 72/283 |

*Primary Examiner*—Paul A. Bell
*Assistant Examiner*—Kenneth J. Ramsey
*Attorney, Agent, or Firm*—Arthur E. Fournier, Jr.

[57] ABSTRACT

A method of providing tubes, of the type intended primarily for use in boilers, with a variably rifled interior surface. The function of the latter surface is to create a turbulence within the tube operative to break up laminar flow of the water or steam flowing therethrough so as to thereby promote more efficient heat transfer during steam generation and so as to prevent overheating of the tube. The subject method includes the steps of providing a suitably dimensioned, smooth surface, hardened mandrel; wrapping a wire-like member on the hardened mandrel so as to form thereon a reverse image of the desired, variably patterned tube rifling; inserting the hardened mandrel into a tube; with the hardened mandrel so positioned in the tube producing a reduction in the tube diameter so as to cause the wire-like member to become embedded in the inner wall of the tube; and thereafter withdrawing the hardened mandrel from the tube while leaving the wire-like member embedded in the tube inner wall. In accord with this form of the invention, the ends of the wire-like member are preferably tack welded in place to prevent the dislodgment thereof. In accord with another form of the invention, the wire-like member subsequent to the withdrawal of the hardened member from the tube is also withdrawn therefrom leaving an impression thereof in the tube inner wall that is operative to effect the introduction of the turbulence, which is desired, into fluid flowing through the tube.

10 Claims, 7 Drawing Figures

METHOD OF FORMING VARIABLY RIFLED TUBES

CROSS-REFERENCE TO RELATED APPLICATIONS

This application is hereby cross-referenced to the following two patent applications which were commonly filed herewith and which are commonly assigned: U.S. patent applications Ser. No. 06/073,967, filed Sept. 10, 1979 entitled, "RIB DESIGN FOR BOILER TUBES," filed in the name of Charles D. Hackett; and U.S. patent application Ser. No. 06/073,969, filed Sept. 10, 1979 entitled, "METHOD OF MAKING VARIABLY RIFLED TUBES," filed in the names of Thomas L. Mabery, et al.

BACKGROUND OF THE INVENTION

This invention relates to tubing utilized in steam generating equipment, and, more specifically, to a method of forming variably rifled boiler tubes wherein the variable rifling is operative to provide controlled internal flow disruption within the tubes so as to thereby prevent stagnation of the steam bubbles that are formed during nucleate boiling.

It is well known to most that a major operating component of any conventionally constructed steam generating system is the boiler. Likewise, it is well known to all that it is in the boiler that the generation of steam is actually effected. In this regard, the aforesaid generation of steam is commonly accomplished as a consequence of the passage of water through a multiplicity of tubes, during which passage the water is sufficiently heated so as to cause it to change state, i.e., to change from a liquid to a vapor.

It is obviously important that boiler tube failure be avoided in such steam generating systems. Relative to the matter of boiler tube failure, one known cause thereof is overheating of the tubes. Furthermore, it is known that an inefficient transfer of heat through the tube wall to the water flowing therewithin can lead to the tubes overheating. The reference here to an inefficient transfer of heat through the tube wall is meant to encompass the situation wherein the accomplishment of the desired heat transfer process is impeded by the presence of so-called nucleate boiling, i.e., wherein stagnating steam bubbles that function in the nature of insulation impedes the passage of the heat through the tube wall to the water flowing therewithin.

To summarize, the condition which is sought to be avoided here in an effort to minimize the susceptibility of the tubes to become overheated as a result of nucleate boiling, is that wherein there exists within the tube a laminar flow of water or steam. As used herein, the term laminar flow is meant to refer to a streamline or viscous flow of the fluid axially of the tube. Namely, it is desired to effect the breaking up of such laminar flow in the tube.

As the water flows through the tube, the outer layer of the water, i.e., the layer of water in closest proximity to the inner wall of the tube, becomes heated by the heat being transmitted through the tube wall. As a consequence thereof, the outer layer of water changes to steam. During this process of changing to steam, the first change, which the outer layer of water undergoes, is the formation therein of steam bubbles. It has been previously mentioned hereinbefore that steam bubbles act as an insulation. Consequently, unless the steam bubbles, which are being formed in the outer layer of water are made to mix, they will, in essence, remain stationary, i.e., stagnate, and take on the attributes of an insulative film, thereby causing localized hot spots to develop along the tube wall. Moreover, such hot spots, in turn, can cause overheating of the tube, and ultimately lead to tube failure. Additionally, unless they are made to mix, the steam bubbles by virtue of their insulative capability will also function to prevent further heating of the core of water, which is passing rapidly through the center of the tube in the form of laminar flow, as described above.

Thus, from the preceding, it should be readily apparent that in order to achieve the rapid and efficient transfer of heat through the tube walls to the water flowing therewithin, there exists a need to provide some form of means that would be operative to effect the breaking up of the laminer flow of water through the tube. Namely, some such form of means is needed to effect the mixing of the outer layer of water and thereby also the steam bubbles entrained therein with the core of water flowing through the central region of the tube. One such form of means, which has been employed heretofore in the prior art, to achieve a controlled internal disruption of the flow of water through a boiler tube has involved the usage of ribbing, i.e., rifling, on the internal surfaces of the boiler tubes.

As regards the nature of the existing prior art teachings relating to the matter of providing boiler tubes with rifled inner wall surfaces, reference may be had by way of exemplification for purposes of obtaining a familiarity therewith to the following U.S. Pat. Nos. 3,088,494; 3,213,525; 3,272,961; 3,289,451 and 3,292,408. More specifically, U.S. Pat. No. 3,088,494, which issued to P. H. Koch, et al. on May 7, 1963, is directed to providing a vapor generating tube that has its interior wall formed with helical lands and grooves, which are proportioned and arranged in a particular predetermined fashion. In accord with another such exemplary prior art teaching, U.S. Pat. No. 3,213,525, which issued to W. M. Creighton, et al. on Oct. 26, 1965, is directed to a method of forming an internal rib in the bore of a tube wherein material is removed from the inner tube wall by means of a cutting operation to form the subject ribbing. A still further example of these prior art teachings can be found in U.S. Pat. No. 3,272,961, which issued to L. A. Maier, Jr., et al. on Sept. 13, 1966, and wherein a method and apparatus are taught for making ribbed vapor generating tubes and in accordance with which a rib is deposited on the inside surface of the tube by means of a welding process. U.S. Pat. No. 3,289,451, on the other hand, which issued to P. H. Koch, et al. on Dec. 6, 1966, is directed to a method and apparatus for forming internal helical ribbing in a tube wherein the internal ribbing is formed by means of a cold drawing operation. Finally, U.S. Pat. No. 3,292,408, which issued to J. R. Hill on Dec. 20, 1966, is directed to a method of forming internally ribbed tubes wherein the tube is provided with an asymmetrical helical groove so as to facilitate removal of the forming tool from the tube.

Notwithstanding the existence of the aforedescribed prior art teachings, there has nevertheless been demonstrated a need for a new and improved method of providing boiler tubes with a rifled interior surface. More specifically, the prior art methods that have been employed for this purpose heretofore have all been adversely characterized by the fact that they each suffer from certain notable disadvantages. For instance, those prior art methods and apparatus that involve the removal of metal from the interior wall surface of the tube to effect the formation thereat of helical lands and grooves suffer from the standpoint of cost. Namely, from a cost standpoint, effecting the formation of rifled tubes by means of methods involving the removal of metal from the inner tube surface constitutes a relatively uneconomical method of manufacturing the same. That is, it is relatively expensive to form helical grooves and lands in the inner wall surface of a tube by a metal removal process, and particularly in applications like the present one wherein there is a concomitant requirement that both the helical grooves and the helical lands each be of precise dimensions.

Another disadvantage from which prior art methods and apparatus for forming rifled tubes are known to suffer, and particularly such methods and apparatus wherein a metal deformation process is utilized involving the insertion of a member into the tube, is the difficulty that has been encountered in effectuating the removal of the member from the tube following completion of the metal deformation process. More specifically, in accord with such methods and apparatus, a member having a predetermined external configuration is inserted into the tube, and thereafter the tube is reduced in diameter such that the helical pattern that the member embodies is formed in the inner wall of the tube. In order to thereafter remove this member from the tube, it is necessary, because of the fact that the interior surface of the tube has been deformed so as to become essentially an exact complement of the member's external surface, to virtually unscrew the member from the tube to effect the removal of the former from the latter. Generally, speaking, the degree of difficulty that is encountered in effecting the removal of the aforesaid member from the tube is dependent on the length of the member, which has been inserted into the tube, and the relative extent to which the pattern formed on the inner tube wall is a true complement of the pattern formed on the external surface of the aforesaid member, i.e., to the extent the member and the tube take on the attributes of a threaded fastener that is threadedly engaged in a cooperating threaded nut.

Still another disadvantage from which prior art methods and apparatus for effecting the formation of rifled boiler tubes are known to suffer is the inherent inflexibility associated with the use thereof insofar as concerns effectuating variations in the configuration of the pattern that is to be formed in the surface of the tube inner wall. Namely, as noted above, nucleate boiling can lead to the development of localized hot spots that, in turn, can cause overheating and ultimately boiler tube failures. To minimize the establishment of such localized hot spots in boiler tubes stemming from the existence of nucleate boiling, it has been proposed by the prior art to provide ribbing, i.e., rifling, on the inner wall surface of the tube. Unfortunately, however, the methods and apparatus known in the prior art here to date for effectuating the making of such rifled tubing render it virtually impossible to enable variations in pattern configuration to be implemented for purposes of compensating for variations in the location of potential hot spots along the inner walls of the tubes. That is, existing methods and apparatus are limited to the utilization of patterns of fixed configuration, such that each boiler tube irrespective of the location it occupies in the boiler, i.e., its relative exposure to external sources of heat, is necessarily provided with the same pattern of rifling, even though from a heat transfer standpoint, it would be desirable to vary the pattern as between locations within the same tube, as well as between different tubes in the same boiler.

To summarize, a method of providing boiler tubes with a rifled inner surface is desired that would embody, among others, the following characteristics. First, there is desired a method that, from the standpoint of cost of manufacture, is relatively economical to utilize. Secondly, a method is desired, which, from the standpoint of ease of usage, is relatively simple to employ. Thirdly, a method is desired, which is characterized by the fact that it enables a selection to be made amongst a diversity of patterns of rifling that are capable of being employed in a boiler tube inner wall, such that the use of a given rifled pattern can be predicated upon the fulfillment of the heat transfer requirements, which are particular to each individual boiler tube.

It is, therefore, an object of the present invention to provide a new and improved method of making boiler tubes wherein the latter are provided with means operative to cause a controlled internal flow disruption to be effected therewithin.

It is another object of the present invention to provide such a method of making boiler tubes wherein the latter are provided with inner tube surfaces that are rifled.

It is still another object of the present invention to provide such a method of making boiler tubes, which is operative to enable boiler tubes to be provided that are variably rifled.

A further object of the present invention is to provide such a method of making variably rifled boiler tubes wherein the pattern of rifling desired to be formed in the tube inner surface is established by detachably wrapping a wire-like member around the circumference of a hardened mandrel.

A still further object of the present invention is to provide such a method of making a variably rifled boiler tube wherein a hardened mandrel having a wire-like member detachably wrapped around the circumference thereof to establish a pattern thereon is inserted into the tube whereupon a reduction in tube diameter is effected causing the wire-like member to become embedded in the inner wall of the tube.

Yet another object of the present invention is to provide such a method of making a variably rifled boiler tube wherein, alternatively, either the hardened mandrel may be removed from the boiler tube leaving the wire-like member embedded in the tube inner wall so as to be operative in the manner of rifling, or both the hardened mandrel and the wire-like member may be removed from the boiler tube, in which case the impression left by the wire-like member in the inner surface of the tube is operative as rifling.

Yet still another object of the present invention is to provide such a method of making a variably rifled boiler tube which is advantageously characterized by the fact that it is relatively inexpensive to utilize, relatively simple to employ, and is extremely flexible insofar as concerns the variety of different patterns of rifling that can be formed therewith in boiler tubes.

SUMMARY OF THE INVENTION

In accordance with the present invention, there is provided a new and improved method of providing boiler tubes with a variably rifled interior surface. The subject method, which is predicated upon a determination of the rifled pattern that is required to provide the boiler tube with the desired heat transfer characteristics to prevent the boiler tube from overheating as a consequence of the existence of nucleate boiling, includes the steps of providing a suitably dimensioned, smooth surface, hardened mandrel; wrapping a wire-like member on the hardened mandrel so as to form thereon a reverse image of the desired, variably patterned tube rifling; inserting into a tube the hardened mandrel with the wire-like member wrapped therearound; with the hardened mandrel suitably positioned in the tube effecting a reduction in the tube diameter so as to cause the wire-like member to become embedded in the inner surface of the tube wall; and thereafter withdrawing the hardened mandrel from the tube while leaving the wire-like member embedded in the inner wall of the tube. In accord with this aspect of the invention, following removal of the hardened mandrel from the tube, the ends of the wire-like member are preferably tack welded in place to prevent the dislodgement thereof. In accord with another aspect of the invention, following the withdrawal of the hardened mandrel from the tube interior, the wire-like member is also removed therefrom leaving an impression thereof in the inner wall of the tube, which is operative in the manner of rifling to produce controlled internal flow disruption within the tube so as to thereby promote more efficient heat transfer during steam generation and so as to prevent overheating of the tube.

DESCRIPTION OF A PREFERRED EMBODIMENT

Figure 4:
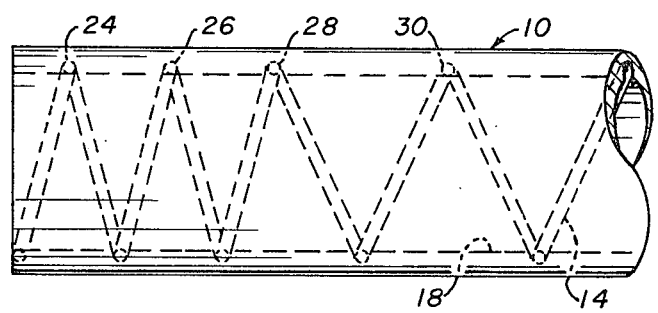
FIG. 4 is a side elevational view of a portion of a boiler tube that has been provided in accordance with the method of the present invention with variable rifling that is in the form of a helical wire, the latter being depicted embedded in the inner wall surface of the tube.

Referring now to the drawing and, more particularly, to FIG. 4 thereof, there is depicted therein a boiler tube, generally designated by reference numeral 10 which, through the practice of the method of the present invention, has been provided with means operable for effecting a controlled internal flow disruption of the fluid that is passed through the boiler tube 10. More specifically, in accord with the illustration thereof in FIG. 4, the boiler tube 10 is provided with variable rifling that functions to produce turbulence within the tube which, in turn, is operative to effect a breaking up of the laminar flow of water or steam that is flowing through the tube so as to thereby promote more efficient heat transfer during steam generation and so as to prevent overheating of the tube, particularly that stemming from the stagnation of the steam bubbles formed during nucleate boiling.

Figure 1:
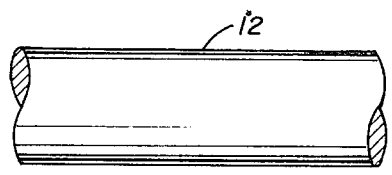
FIG. 1 is a side elevational view of a portion of a hardened mandrel of the type that is employed for purposes of providing a boiler tube with variable rifling in accordance with the method of the present invention.

In accordance with the best mode embodiment of the invention, a method is provided wherein a hardened mandrel 12, a portion of which has been depicted in FIG. 1 of the drawing, is utilized in the making of the variably rifled boiler tube 10. The hardened mandrel 12 is preferably provided with a smooth surface, and is suitably dimensioned so as to be received within the boiler tube 10 for a purpose and in a manner that has yet to be described herein. More specifically, the hardened mandrel 12 may take the form of any suitable conventional type of metallic member that is substantially cylindrical in configuration, and which is capable of being utilized in the manner of a mandrel.

Figure 2:
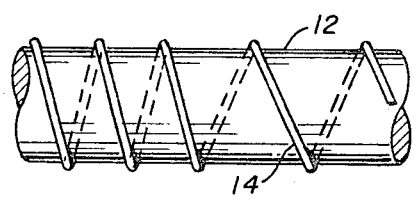
FIG. 2 is a side elevational view of the hardened mandrel of FIG. 1, illustrated with a wire-like member wrapped around the circumference thereof so as to form thereon the pattern of rifling with which the boiler tube is to be provided in accordance with the method of the present invention.
Figure 6:
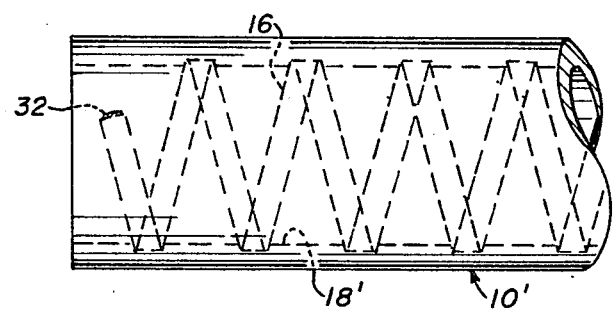
FIG. 6 is a side elevational view of a portion of a boiler tube that has been provided in accordance with the method of the present invention with variable rifling that is in the form of a spiral flat strip, the latter being depicted embedded in the inner wall surface of the tube.

As illustrated in FIG. 2 of the drawing, the hardened mandrel 12 has a wire-like member wrapped around the circumference thereof. The aforesaid wire-like member may take the form of a helical wire 14 of the type shown in FIGS. 2–4, or a spiral flat strip 16 as shown in FIG. 6, or any other type of wire-like member that is the functional equivalent of the helical wire 14 and the spiral flat strip 16. Namely, in accord with the best mode embodiment of the invention, the method of making a variably rifled boiler tube to which the present invention is directed includes the step of establishing on the external surface of the hardened mandrel 12 a mirror image of the pattern of variable rifling with which it is intended that the inner surface of the boiler tube be provided. In this regard, the nature of the particular pattern of variable rifling with which any boiler tube is provided is derived from a consideration of the heat transfer characteristics which it is desired that a given boiler tube embody in order to enhance heat transfer during steam generation as well as to minimize the susceptibility of the boiler tube to overheat through the stagnation of steam bubbles within the tube in juxtaposed relation to the inner tube wall surface thereof.

Figure 3:
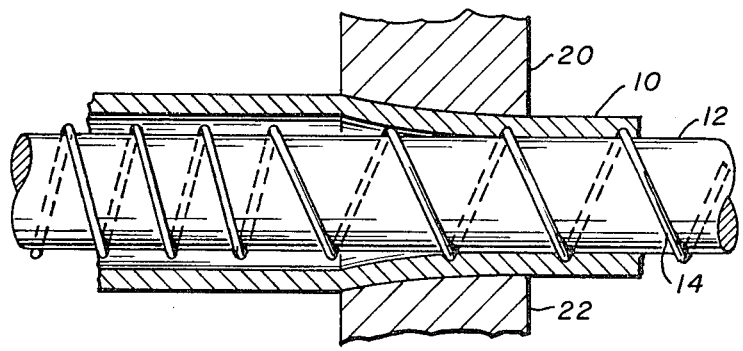
FIG. 3 is a side elevational view, partially in section, of a boiler tube depicted being drawn around the hardened mandrel of FIG. 2, in accordance with the performance of the tube diameter reducing step of the method of the present invention.

With the desired pattern of variable rifling having been established on the external surface of the hardened mandrel 12 through the wrapping of a wire-like member, e.g., the helical wire 14 or the spiral flat strip 16, around the circumference thereof, the next step in accordance with the performance of the best mode embodiment of the method of the present invention is to insert the hardened mandrel 12 with the aforedescribed wire-like member wrapped thereon into a boiler tube, e.g., the boiler tube 10. As best understood with reference to FIG. 3 of the drawing, with the hardened mandrel 12 suitably positioned within the boiler tube 10, the diameter of the latter is reduced. To this end, the step of reducing the diameter of the boiler tube 10 may be effected through the use of any suitable conventional type of metal deforming process. More specifically, the boiler tube 10 with the hardened mandrel 12 positioned therewithin is preferably made to pass between a suitable pair of conventional swaging dies 20 and 22, whereby the desired reduction of the diameter of the tube 10 is effected through the well-known method of metal deforming known to those skilled in the art as swaging. As a consequence of the aforedescribed reduction in tube diameter, the wire-like member, which as shown in FIG. 3 comprises the helical wire 14, becomes embedded, i.e., forms an indentation in which the wire 14 rests, in the surface of the inner wall 18 of the boiler tube 10. This embedment of the helical wire 14 in the inner tube wall 18 provides the boiler tube 10 with the desired rifled pattern. As set forth previously herein, this rifled pattern is, in turn, operative to introduce turbulence into the flow of the water or steam passing through the boiler tube 10 so as to break up the laminar flow thereof. In conclusion, although in accordance with the best mode embodiment of the method of the present invention, the aforesaid step of tube diameter reduction is preferably effected through a swaging process, it is to be understood that other methods of metal deformation operable for purposes of effecting a reduction in tube diameter, which are known to those skilled in the art, could also be employed in the performance of the method of the present invention without departing from the essence thereof.

Once the diameter of the boiler tube has been reduced in the manner described above, such that the helical wire 14 has become embedded in the inner tube wall 18, the next step that is performed in the practice of the method of making a variably rifled boiler tube in accordance with the present invention is the effectuation of the removal of the hardened mandrel 12 from the interior of the boiler tube 10. Unlike prior art methods, which are disadvantageously characterized in this regard, the removal of the hardened mandrel 12 from the interior of the boiler tube 10 can be accomplished in a facile manner. Namely, when a pulling force is applied to the exposed end of the hardened mandrel 12, slippage is made to occur between the circumference of the hardened mandrel 12 and the helical wire 14 that is wrapped around the circumference thereof. As a consequence of this slippage, the hardened mandrel 12 can be easily pulled directly, i.e., in a substantially axial direction from the interior of the boiler tube 10 while the helical wire 14 remains positioned, i.e., embedded, in the indentation, i.e., impression thereof, formed thereby in the inner tube wall 18 during the aforedescribed swaging operation. This is in contradistinction to prior art methods wherein a need exists to effectively unscrew the mandrel from the interior of the tube. This is because, as has been noted previously herein, in accordance with such prior art methods, the hardened mandrel employed in the practice thereof has a rifled pattern integrally formed on the circumference of the mandrel whereby the hardened mandrel takes on the attributes of a threaded fastener, when a reduction in tube diameter is effected for purposes of providing the tube interior wall surface with the rifled pattern provided on the circumference of the mandrel, i.e., under such conditions, the rifled pattern on the mandrel effectively causes the formation of a rifled pattern in the interior of the tube, which embodies the attributes of a multiplicity of complementary grooves for receiving therewithin the raised surface portions that comprise the rifled pattern on the mandrel.

With the hardened mandrel 12 removed from the interior of the boiler tube 10, there is provided in accordance with the method of the present invention a boiler tube 10 that has a variable rifled pattern formed in the inner wall 18 thereof. Reference may be had to FIG. 4 of the drawing for an illustration of such a boiler tube 10 embodying a variable rifled pattern. Particular note is taken here of the fact that the boiler tube 10, as depicted in FIG. 4, is provided with variable rifling; namely, the axial distance between adjacent helixes of the helical wire 14 varies axially along the length of the boiler tube 10. More specifically, the distance measured axially along the helical wire 14 between the points identified by reference numerals 24 and 26 in FIG. 4 is less than the distance measured along the helical wire 14 between the points identified by reference numerals 28 and 30 in the same Figure of the drawing. As has been previously discussed herein in some detail, in accordance with the method of the present invention, it is possible to provide the boiler tube 10 with a variable rifled pattern, such that the rifled pattern with which the boiler tube 10 is provided conforms to the heat transfer characteristics, which the boiler tube 10 desirably should embody in order for it to efficiently perform the steam generation function intended thereof as well as the avoidance of the overheating of the boiler tube occasioned by the existence of nucleate boiling. In this regard, the boiler tube 10 is advantageously characterized as compared to the boiler tubes that are provided in accordance with known prior art methods and apparatus with non-variable rifling.

Continuing with the description of the method in accordance with the present invention of providing a boiler tube with variable rifling, in accord with one aspect of the invention, the ends of the wire-like member which has been embedded in the inner wall of the tube to form a rifled pattern therein are preferably tack welded to the tube interior. This is done preferably in order to avoid dislodgment of the ends of the wire-like member from the inner surface of the tube. Obviously, however, some other conventional form of means suitable for this purpose could be utilized to effect the retention of the ends of the wire-like member in engagement with the tube inner wall, without department from the essence of the present invention. Reference may be had to FIG. 6 of the drawing, wherein there is depicted a wire-like member, which has one end thereof tack welded, the latter being identified by reference numeral 32, to the tube inner wall surface. The other end of the wire-like member is not illustrated in FIG. 6 as also being tack welded to the tube inner surface, in the interest of maintaining clarity of illustration of the drawing. However, it is to be understood that the other end of the wire-like member of FIG. 6 is also preferably tack welded to the tube inner wall. Similarly, although not illustrated in FIG. 4 in the interest of maintaining clarity of illustration therein, it is to be understood that in accord with the best mode embodiment of the invention, the ends of the helical wire 14 are preferably tack welded to the tube inner wall 18.

Figure 5:
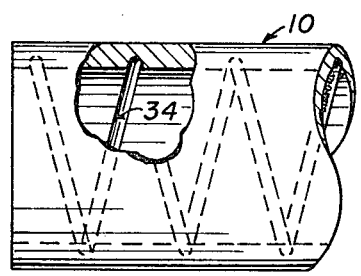
FIG. 5 is a side elevational view, partially in section, of a portion of a boiler tube that has been provided in accordance with another aspect of the method of the present invention with variable rifling that is in the form of an impression of a helical wire, which is provided in the inner wall surface of the tube.

In accordance with another aspect of the present invention, the subject method of making a variably rifled boiler tube includes the additional step of also removing the wire-like member, e.g., the helical wire 14 or spiral flat strip 16, from the inner wall of the tube, subsequent to the removal of the hardened mandrel from the tube interior. With reference to FIG. 5 of the drawing, there is depicted therein the boiler tube 10 with the helical wire 14 removed from the interior thereof. Assuming that the subject method encompasses the additional step of withdrawing the wire-like member from the tube interior, this step is preferably performed before the ends of the wire-like member have been tack welded, or otherwise attached to the tube inner wall. Consequently, with the ends of the wire-like member unattached to the tube inner wall, the removal of the wire-like member from the tube interior is a relatively simple matter. Namely, with the hardened mandrel withdrawn from the tube interior, a simple grasping of one free end of the wire-like member and the pulling thereon will serve to free the wire-like member from the indentations, the latter being identified by the reference numeral 34 in FIG. 5 of the drawing, in which it is embedded. More specifically, pulling on the end of the wire-like member will cause the latter to compress upon itself whereby it can be readily removed from the interior of the tube. Once the wire-like member, e.g., the helical wire 14 of FIG. 4, is removed from the boiler tube 10, there remains formed in the inner wall 18 thereof a variably rifled pattern consisting of the indentations previously made therein by the helical wire 14 that had been wrapped around the circumference of the hardened mandrel 12 during the previously described swaging operation. These indentations 34 left by the now removed helical wire 14 are operative in the manner of a variably rifled pattern to effect the introduction of turbulence into the flow of the water or steam through the boiler tube 10 such as to promote efficient heat transfer during the steam generation process that occurs therein as well as the minimization of the susceptibility of the tube 10 to overheat as a consequence of the stagnation of the steam bubbles that are formed during nucleate boiling.

Figure 7:
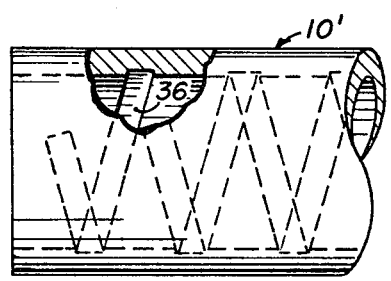
FIG. 7 is a side elevational view, partially in section, of a portion of a boiler tube that has been provided in accordance with another aspect of the method of the present invention with variable rifling that is in the form of an impression of a spiral flat strip, which is provided in the inner wall surface of the tube.

A brief description will now be had of each of the FIGS. 4, 5, 6 and 7 of the drawing. FIG. 4 depicts a boiler tube 10, which has been provided in accordance with the method of the present invention with variable rifling. More specifically, the variable rifling with which the boiler tube 10 of FIG. 4 is provided consists of a helical wire 14 that is embedded in the inner wall 18 of the tube 10. Moreover, in accordance therewith, although not shown in the drawing in the interest of maintaining clarity of illustration therein, the ends of the helical wire 14 are preferably tack welded to the tube interior 18. FIG. 5 depicts the boiler tube 10 with the helical wire 14 removed from the interior thereof leaving a series of indentations 34 in the tube inner wall 18, which comprises the pattern of variable rifling with which the boiler tube 10 is provided. FIG. 6 illustrates a boiler tube identified by the reference 10', which is essentially identical to the boiler tube 10 of FIGS. 4 and 5, except that the variable rifling with which the boiler tube 10' is provided in accordance with the method of the present invention consists of spiral flat strip 16 that is embedded in the tube interior wall 18' rather than the helical wire 14 embedded in the tube inner wall 18. In the interest of maintaining clarity of illustration in the drawing, only one end of the spiral flat strip 16 is depicted at 32 in FIG. 6 as being tack welded to the tube inner wall 18'. However, it is to be understood that the other end thereof is also tack welded to resist dislodgment of the spiral flat strip 16 from the tube inner wall 18'. FIG. 7 depicts the boiler tube 10' with the spiral flat strip 16 removed from the interior thereof leaving a series of indentations 36 in the tube inner wall 18', which comprise the pattern of variable rifling with which the boiler tube 10' is provided.

It can, thus, be seen that in accordance with the present invention there is provided a method of making a variably rifled boiler tube, which encompasses the steps of providing a suitably dimensioned, smooth surface, hardened mandrel; establishing a variable pattern of rifling on the external surface of the hardened mandrel by wrapping a wire-like member around the circumference thereof in a pattern designed to provide the boiler tube with the desired heat transfer characteristics to promote efficient heat transfer during steam generation and to minimize stagnation of the steam bubbles that are formed during nucleate boiling; inserting the hardened mandrel with the wire-like member wrapped thereon into the interior of the boiler tube; effecting a reduction of the tube diameter so as to cause the wire-like member wrapped around the hardened mandrel to become embedded in the inner wall of the tube so as to thereby provide the latter with a pattern of variable rifling; and effecting the withdrawal of the hardened mandrel from the interior of the tube such as to leave the wire-like member embedded in the tube inner wall. In accordance with one aspect of the present invention, the ends of the wire-like member are attached to the inner wall of the boiler tube, preferably by being tack welded thereto, to resist the dislodgment thereof from the interior surface of the tube. In accord with another aspect of the present invention, the wire-like member is withdrawn from the tube interior leaving the indentations formed thereby in the surface of the tube inner wall. The latter indentations function to provide the boiler tube with a pattern of variable rifling that is formed internally thereof.

Specific mention is made here of the fact that in accord with the best mode embodiment of the present invention, the wire-like member comprises a member, which is untempered, and which embodies a lesser hardness than does the hardened mandrel, but a greater hardness than does the inner surface of the tube. Accordingly, during the course of the performance of the step in the subject method of the present invention wherein the intent is to effect the impression of the wire-like member into the inner wall surface of the tube, the existence of a relative in hardness as between the tube inner wall surface and the wire-like member renders the former, as between the two, more susceptible to being deformed than the latter.

Note is also taken here of the fact that the method of the present invention is advantageously characterized as compared to prior art methods of providing tubes with ribbing in that, with the present method, it is possible to utilize a tube, which at the commencement of the performance of the method of the present invention, embodies the specific dimensions of a finished tube, especially in terms of wall thickness, i.e., the dimensions that it is desired that the tube possess in order to meet the strength, etc., requirements dictated therefor by the operating parameters to which the tube is to be subjected in an operating environment. Reference is had here particularly to the minimum wall thickness of the tube measured at the grooves, which when considered with the associated lands, form the tube rifling. In contrast thereto, in accord with prior art methods, and especially those wherein material is machined from the tube inner surface to provide a tube with internal rifling, it is necessary to start with a tube of increased wall thickness in order that the tube will embody the desired minimum wall thickness, measured at the grooves formed therein, following the completion of the step of metal removal performed in the course of providing the tube with rifling, i.e., upon completion of the process of providing the tube with rifling. In terms of cost, there is a significant penalty attached to the employment of a tube of increased wall thickness simply for purposes of effectuating the formation of rifling in the tube. To summarize, the method of the present invention is performed on a tube embodying the dimensions in terms of wall thickness desired of a finished tube, whereas prior art methods, for the most part, are predicated upon the utilization of a tube, which needs to be oversized in terms of wall thickness to begin with, and which, during the course of being provided with ribbing, undergoes a reduction in wall thickness.

Thus, in accordance with the present invention, there has been provided a new and improved method of making boiler tubes wherein the latter are provided with means operative to cause a controlled internal flow disruption to be effected therewithin. Moreover, the subject method of the present invention encompasses the making of boiler tubes wherein the latter are provided with inner tube surfaces that are rifled. In addition, in accord with the present invention, a method of making boiler tubes is provided wherein the boiler tubes made thereby are capable of being provided with variable rifling. Further, the method of the present invention enables the pattern of rifling desired to be formed in the tube inner wall to be established by detachably wrapping a wire-like member around the circumference of a hardened mandrel. Additionally, in accordance with the present invention, a method of making a variably rifled boiler tube is provided wherein a hardened mandrel having a wire-like member detachably wrapped around the circumference thereof to establish a pattern thereon is inserted into the tube whereupon a reduction in tube diameter is effected causing the wire-like member to become embedded in the inner surface of the tube. Also, the method of the present invention alternatively enables either the hardened mandrel to be removed from the boiler tube leaving the wire-like member embedded in the tube inner surface so as to be operative in the manner of rifling, or both the hardened mandrel and the wire-like member may be removed from the boiler tube, in which case the impression left by the wire-like member in the inner surface of the tube is operative as a rifling. Furthermore, in accord with the present invention, a method of making a variably rifled boiler tube is provided which is advantageously characterized by the fact that it is relatively inexpensive to utilize, relatively simple to employ, and is extremely flexible insofar as concerns the variety of different patterns of rifling that can be formed therewith in boiler tubes.

While several embodiments of our invention have been shown, it will be appreciated that modifications thereof, some of which have been alluded to hereinabove, may still be readily made thereto by those skilled in the art. We, therefore, intend, by the appended claims, to cover the modifications alluded to herein as well as all other modifications, which fall within the true spirit and scope of our invention.

What is claimed is:

1. A method for forming variable rifling in the inner wall of a tubular member comprising the steps of:
   a. providing a mandrel having a lesser diameter than the internal diameter of the tubular member;
   b. wrapping a wire-like member around the circumference of the mandrel so as to establish a predetermined pattern on the external surface of the mandrel corresponding to the pattern of variable rifling to be formed in the inner wall of the tubular member;
   c. inserting the mandrel with the wire-like member wrapped thereon into the interior of the tubular member;
   d. effecting a reduction in the diameter of the tubular member so as to cause the wire-like member to become embedded in the inner wall of the tubular member; and
   e. withdrawing the mandrel from the interior of the tubular member thereby leaving the wire-like member embedded in the inner wall of the tubular member such that the embedded wire-like member functions to provide the inner wall of the tubular member with a pattern of variable rifling.

2. A method as set forth in claim 1 wherein the step of effecting a reduction in the diameter of the tubular member is accomplished through the process of swaging.

3. A method as set forth in claim 1 further including the step of removing the wire-like member from the interior of the tubular member thereby leaving in the inner wall of the tubular member the indentations formed by the embedment of the wire-like member therein such that these indentations function to provide the inner wall of the tubular member with a pattern of variable rifling.

4. A method as set forth in claim 1 further including the step of attaching the ends of the wire-like member to the inner wall of the tubular member to prevent the ends of the wire-like member from becoming dislodged from the inner wall of the tubular member.

5. A method as set forth in claim 4 wherein the step of wrapping a wire-like member around the circumference of the mandrel comprises the step of wrapping a helical wire around the external surface of the mandrel.

6. A method as set forth in claim 5 wherein the step of inserting the mandrel with the wire-like thereon into the interior of the tubular member comprises the step of inserting the mandrel with a helical wire wrapped thereon into the interior of the tubular member.

7. A method as set forth in claim 6 wherein the pattern of variable rifling provided in the inner wall of the tubular member is formed by the embedment of a helical wire in the inner wall of the tubular member.

8. A method as set forth in claim 4 wherein the step of wrapping a wire-like member around the circumference of the mandrel comprises the step of wrapping a spiral flat strip around the external surface of the mandrel.

9. A method as set forth in claim 8 wherein the step of inserting the mandrel with the wire-like member thereon into the interior of the tubular member comprises the step of inserting the mandrel with a spiral flat strip wrapped thereon into the interior of the tubular member.

10. A method as set forth in claim 9 wherein the pattern of variable rifling provided in the inner wall of the tubular member is formed by the embedment of a spiral flat strip in the inner wall of the tubular member.

* * * * *